March 22, 1932.  C. G. OLSON  1,850,242
LOCK WASHER
Filed May 23, 1930
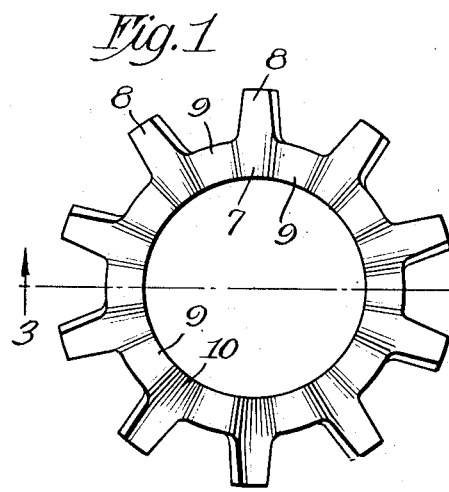
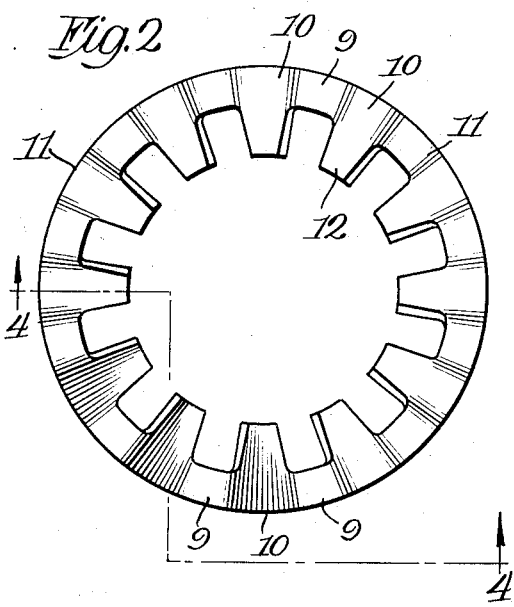
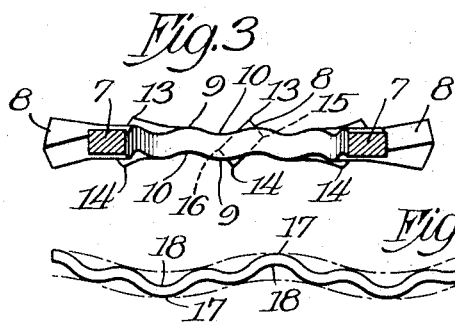
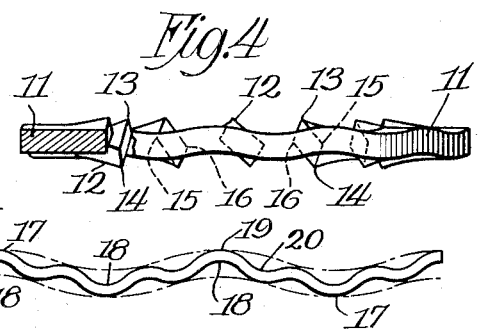
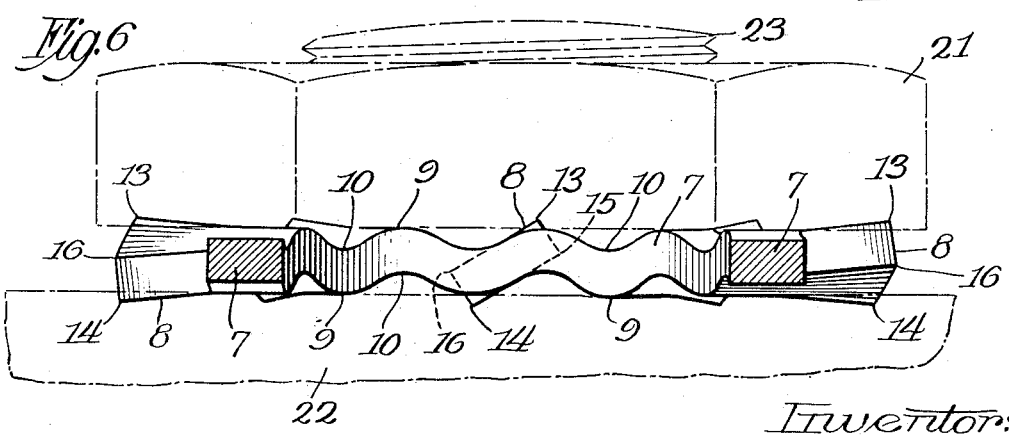
Inventor:
Carl G. Olson
By Cheever, Cox & Moore Attys Patented Mar. 22, 1932

1,850,242

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER

Application filed May 23, 1930. Serial No. 454,848.

This invention relates to lock washers.

The primary object of the present invention is to provide a new and improved lock washer having twisted prongs or teeth which engage the work and the fastening member to which it is applied.

Another object is to provide a lock washer having a corrugated body and work engaging teeth whereby pressure is first exerted on the lock washer teeth before it is transmitted to the body thereby causing the teeth to be forced into the surfaces of the work to make a positive lock.

A further object is to provide a lock washer having twisted work engaging prongs or teeth which are stiff enough to carry the greater part of the pressure without flattening, and which act as struts for assisting in carrying the load, the struts always being in locking position to give the maximum locking action without totally flattening.

A still further object is to provide a corrugated lock washer which has twisted teeth, which has the diagonal corners of each of the teeth projecting above and below the top and bottom of the corrugated ridges in the rim.

Still another object is to provide a corrugated ring washer which has twisted teeth, which has the remaining diagonal corners of the teeth within the planes of the corrugation on each side.

Numerous other objects and advantages will be apparent throughout the progress of the following specification.

The invention comprises in general a lock washer having extended twisted teeth. These teeth may extend outwardly from the outer periphery of the washer or the teeth may extend inwardly from the body. The body of the washer is corrugated radially to provide alternate ridges and furrows. The corrugations may be arranged radially of the body so as to assist in twisting the teeth. Two diagonal corners of the teeth extend above and below the top and bottom of the corrugated ridges, while the two remaining diagonal corners of each tooth fall within the plane of the corrugations. The teeth act as struts receiving the load and when the fastening member is tightened in position, the projecting diagonal corners bite into the fastening means and into the work. Considerable pressure must be applied to spring the teeth within the plane of the corrugations. When pressure is applied against the lock washer, the diagonal projecting corners bite into the tightening member and the work until the ridges bear against the work and the tightening means. Normal tightening movement is thus permitted but retrograde movement is prevented. The corrugated ring washer is an improvement over the flat ring as it provides a solid but resilient bearing for a tightening means, such as a nut on a bolt. The teeth bite into the work and the nut sufficiently to prevent retrograde movement thereof while the corrugated body provides a substantial backing for the nut.

The accompanying drawings illustrate a selected embodiment of the invention and the views therein are as follows:

Fig. 1 is a top plan view of the improved washer having external teeth.

Fig. 2 is a similar view of a washer constructed in accordance with the invention having teeth extending internally from the body.

Fig. 3 is a detail sectional view on the line 3—3 of Fig. 1.

Fig. 4 is a detail sectional view on the line 4—4 of Fig. 2.

Fig. 5 is a schematic or diagrammatic view showing the manner in which the body may be corrugated.

Fig. 6 is an enlarged detail sectional view of an external toothed washer arranged in position on the work.

Referring to Figs. 1, 3, and 6 of the drawings, 7 designates a ring having outwardly extending teeth 8. The ring or body 7 is corrugated radially to provide ridges 9 and furrows 10. The ridge 9 at the top of the body forms a furrow 10 on the bottom while the furrow 10 on the top forms the ridge 9 on the bottom. These ridges and furrows alternate as clearly shown in the drawings and are formed in the washer by stamping.

The washer shown in Figs. 2 and 4 comprises an annular body 11 having internal inwardly extending teeth 12. This washer also has corrugations to provide the alternate ridges and furrows 9 and 10 respectively.

The teeth 8 and 12 are twisted in a plane diagonal to the normal horizontal plane of the body of the washer to provide work engaging edges 13 and 14. These edges are diagonally located in respect to the tooth and extend above and below the top and bottom of the ridges in the body as clearly shown in the various figures, particularly Fig. 6. The opposite corners 15 and 16 are diagonal in respect to each other and are located within the plane of the corrugation as clearly shown.

The corrugations may be variously disposed as shown in Fig. 5. In this figure the body of the washer whether it be of the type shown in Fig. 1 or Fig. 2, is provided with major ridges 17 and furrows 18. These major corrugations may be again crimped or corrugated to provide smaller ridges 19 and furrows 20. In either case the corrugations prevent total flattening of the washer and especially the locking prongs or teeth. If the prongs or teeth were totally flattened, there would be no locking action until the washer is again loosened enough to permit the prongs or teeth to resume their normal angular position. Regardless of the type of corrugation used or the manner in which it is positioned in the body of the washer, a bearing is provided for the washer between the nut 21 and the work 22, Fig. 6. When the nut 21 is tightened on the bolt 23, with the washer located between the nut 21 and the work 22 as shown in Fig. 6, the upper projections 13 of the teeth will bite into the nut and the lower projections 14 will bite into the work. The teeth are sloped so that tightening movement of the nut may be had, but retrograde movement thereof is prevented due to the angular position of these teeth. Continued tightening movement of the nut causes the projections 13 and 14 to bite into the nut and work until the ridges 9 assume the position shown in Fig. 6. The corrugations, therefore, provide a solid but comparatively resilient bearing between the work and the nut. The teeth act as struts which may be subjected to an appreciable pressure before yielding, but the corners 13 and 14 will be forced into the work and the nut. While these teeth act as struts, an appreciable pressure on the washer prevents total flattening thereof due to the corrugations in the washer which transmit some of the pressure to the body of the washer instead of having the entire pressure carried solely by the teeth. The corrugations, however, carry only a small part of the load because the twisted teeth or prongs are stiff enough to carry the greater part of the load without flattening. The corrugations, however, assist in carrying the load and the struts are always maintained in locking position and in a position to give maximum locking action and never totally flatten.

In corrugating the washer the radial corrugations may be formed so as to assist in providing the necessary twist to the prongs or teeth, whereby the lower teeth will be inclined upwardly.

The invention provides a corrugated washer having twisted teeth which provides a solid but resilient bearing for the nut and the work and while the teeth act as struts, the corrugation of the body of the washer assists in carrying the load. The struts are always in locking position and give the maximum locking action without ever totally flattening.

Changes may be made in the form, construction, and arrangement of the various parts without departing from the spirit of the invention or sacrificing any of its advantages, and the right is hereby reserved to make all such changes as fairly fall within the scope of the following claims.

The invention is hereby claimed as follows:

1. A lock washer corrugated to provide radially extending alternate ridges and furrows, and twisted teeth on said washer, certain of the diagonal corners of each of the teeth projecting above and below the top and bottom of the corrugations.

2. A corrugated washer having twisted teeth whereby a pair of diagonal corners of each of the teeth will project above and below the top and bottom of the corrugations in the washer, and the remaining diagonal corners fall within the planes of the corrugations.

3. A lock washer comprising a body portion, teeth extending from said body portion, said teeth and body being corrugated radially to provide alternate ridges and furrows, said teeth having diagonal corners arranged within the plane of said corrugations.

4. A lock washer comprising a body portion, teeth extending from said body portion, said teeth and body being corrugated radially to provide alternate ridges and furrows, diagonal corners of said teeth extending beyond the outer limits of the corrugations, said teeth also having diagonal corners arranged within the plane of said corrugations.

5. A lock washer comprising an annular body portion, and a plurality of prongs formed integral with and extending from a margin of said body portion, said prongs and the immediate sections of the body portion being warped in a given direction out of the normal plane of the washer and the portions of the body connecting said sections being warped in the opposite direction with respect to the plane of the washer, said prongs providing sharp work engaging teeth on opposite sides of the washer.

6. A lock washer comprising an annular body portion, and a plurality of prongs formed integral with and extending from a margin of said body portion, said prongs and the immediate sections of the body portion being warped in a given direction out of the normal plane of the washer and the portions of the body connecting said sections being warped in the opposite direction with respect to the plane of the washer, the free extremity of each prong being warped to a greater degree than the body section immediate thereto, whereby to present sharp work engaging corners on opposite sides of the washer.

In witness whereof, I have hereunto subscribed my name.

CARL G. OLSON.